United States Patent
Ichikawa et al.

(10) Patent No.: US 10,510,997 B2
(45) Date of Patent: Dec. 17, 2019

(54) FILM-COVERED BATTERY

(71) Applicant: Envision AESC Energy Devices Ltd., Sagamihara-shi, Kanagawa (JP)

(72) Inventors: Tomoyuki Ichikawa, Sagamihara (JP); Ikuo Kojima, Sagamihara (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 49 days.

(21) Appl. No.: 15/858,122

(22) Filed: Dec. 29, 2017

(65) Prior Publication Data

US 2018/0123091 A1    May 3, 2018

Related U.S. Application Data

(63) Continuation of application No. 14/411,237, filed as application No. PCT/JP2013/066569 on Jun. 17, 2013, now Pat. No. 9,871,231.

(30) Foreign Application Priority Data

Jun. 18, 2012 (JP) ................................. 2012-136721

(51) Int. Cl.
*H01M 2/02* (2006.01)
*H01M 2/08* (2006.01)
*H01M 10/0525* (2010.01)

(52) U.S. Cl.
CPC ....... *H01M 2/0275* (2013.01); *H01M 2/0202* (2013.01); *H01M 2/0237* (2013.01); *H01M 2/0277* (2013.01); *H01M 2/0285* (2013.01); *H01M 2/0287* (2013.01); *H01M 2/08* (2013.01); *H01M 10/0525* (2013.01);
(Continued)

(58) Field of Classification Search
None
See application file for complete search history.

(56) References Cited

U.S. PATENT DOCUMENTS 7,267,904 B2    9/2007   Komatsu et al.
9,871,231 B2 *  1/2018   Ichikawa ............ H01M 2/0275
(Continued)

FOREIGN PATENT DOCUMENTS

CN    101414671 A    4/2009
EP    1667251 A1    6/2006
(Continued)

OTHER PUBLICATIONS

Communication dated Dec. 2, 2015 from the European Patent Office issued in corresponding European application No. 13807232.7.
(Continued)

*Primary Examiner* — Jonathan Crepeau
(74) *Attorney, Agent, or Firm* — Sughrue Mion, PLLC (57) ABSTRACT

A film-covered battery houses, in a film covering material 4 obtained by stacking a heat sealing layer 13, a barrier layer 12, and a protective layer 11, a battery element 6 obtained by arranging positive and negative electrodes through separators and has a sealing portion that seals a periphery of the film covering material 4 housing the battery element 6. The sealing portion 18 includes an agglomeration/sealing portion 19 and a first interface bonding portion 15 provided so as to be adjacent to the battery element housing portion side of the agglomeration/sealing portion.

19 Claims, 6 Drawing Sheets

(52) U.S. Cl.
CPC .... *H01M 2220/20* (2013.01); *H01M 2220/30* (2013.01); *Y10T 29/49112* (2015.01)

(56) References Cited

U.S. PATENT DOCUMENTS

2007/0009795 A1    1/2007    Otohata et al.
2010/0310930 A1    12/2010    Park et al.

FOREIGN PATENT DOCUMENTS

| JP | 2000-223088 A | 8/2000 |
| JP | 2000-223090 A | 8/2000 |
| JP | 2000-277066 A | 10/2000 |
| JP | 2004-95217 A | 3/2004 |
| JP | 2004-103409 A | 4/2004 |
| JP | 2005-332726 A | 12/2005 |
| WO | 01/56093 A1 | 8/2001 |
| WO | 2005/036674 A1 | 4/2005 |
| WO | 2009/078680 A2 | 6/2009 |

OTHER PUBLICATIONS

Communication dated Mar. 24, 2016 from the State Intellectual Property Office on the P.R.C issued in corresponding Application No. 201380032279.5.
International Preliminary Report on Patentability for PCT/JP2013/066569 dated Dec. 23, 2014.
International Search Report for PCT/JP2013/066569 dated Jul. 23, 2013.
Written Opinion for PCT/JP2013/066569 dated Jul. 23, 2013.
Communication dated Jul. 25, 2019, issued by the European Patent Office in application No. 13 807 232.7.

\* cited by examiner

FILM-COVERED BATTERY

CROSS REFERENCE TO RELATED APPLICATIONS

This application is a Continuation of U.S. application Ser. No. 14/411,237, filed Dec. 24, 2014, which is a National Stage of International Application No. PCT/JP2013-066569, filed Jun. 17, 2013, claiming priority based on Japanese Patent Application No. 2012-136721, filed Jun. 18, 2012, the contents of all which are incorporated herein by reference in their entirety.

TECHNICAL FIELD

The present invention relates to a battery in which a battery element is housed in a film covering material and a manufacturing method thereof and, more particularly, to a film-covered battery having high long-term reliability and a manufacturing method therefore.

BACKGROUND ART

A lithium-ion battery having a high capacity density and a high mass density is mounted not only on a mobile device such a mobile phone or a digital camera but also on an electric bicycle, an electric motor cycle, an electric vehicle, and the like. Further, with diversification of battery usage, demands for a reduction in weight of the battery and high flexibility in design have increased.

As a battery covering member, a metal casing or a film covering material obtained by stacking an aluminum foil or the like and a synthetic resin film is used. As a battery that meets the above requirements, a film-covered battery using the film covering material which is light in weight and high in design freedom degree is much in demand.

The film-covered battery has a configuration in which a battery element having a positive electrode and a negative electrode is covered and sealed with the film covering material such that a positive electrode terminal and a negative electrode terminal are drawn outside the film covering material. The battery covering member has a role of preventing leakage of electrolyte inside the battery and infiltration of water into an inside of the battery, and the sealing portion is responsible for reliability of the battery and has thus been variously devised.

Figure 10:
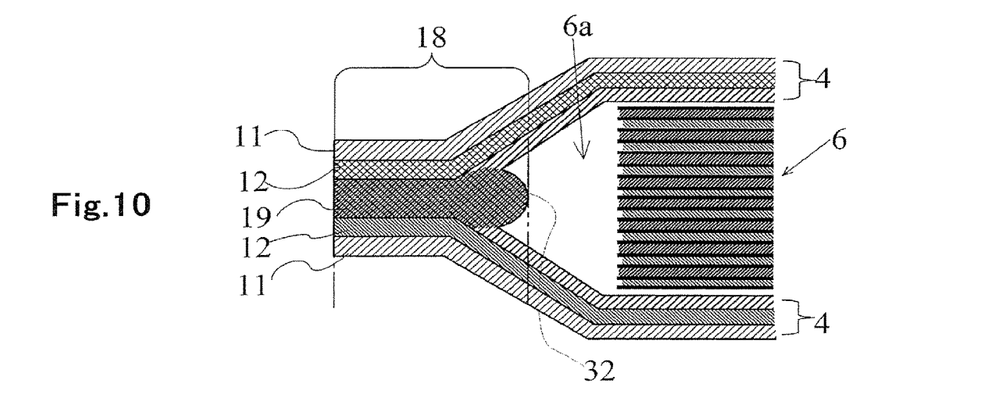
FIG. 10 is a cross-sectional view of a part corresponding to the A-A' cross section of FIG. 1, which explains a conventional film-covered battery.

For example, in Patent Document 1, a resin mass 32 is provided at an inner end of a housing portion 6a of a battery element 6 of an agglomeration/sealing portion 19 which is a welding portion of a metal laminated resin film casing, as illustrated in FIG. 10. As a result, a joint interface has a curved surface, allowing stress to be dispersed to both ends of the resin mass 32, which enhances sealability of the battery.

Further, in Patent Document 2, there is provided a portion where welding is not performed at an inner side of a heat sealing portion of the film covering material. This prevents occurrence of a cut portion of a resin protrusion portion to prevent decrease in peeling strength.

CITATION LIST

Patent Document

Patent Document 1: JP 2000-277066 A
Patent Document 1: JP 2005-332726 A

DISCLOSURE OF THE INVENTION

Problems to be Solved by the Invention

When a gas is generated inside the battery having the structure as disclosed in Patent Document 1 due to repetition of charge and discharge or due to use under a high-temperature environment, the following problems occur.

Figure 11:
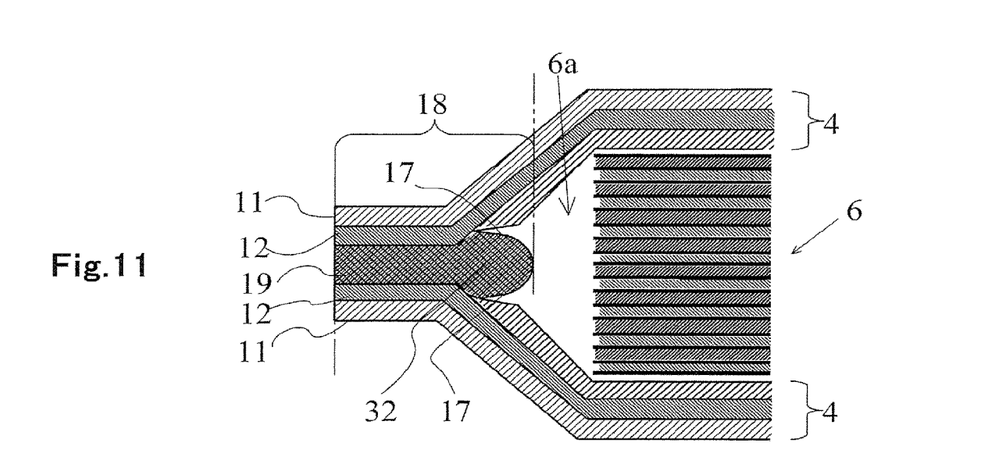
FIG. 11 is a cross-sectional view of a part corresponding to the A-A' cross section of FIG. 1, which explains a conventional film-covered battery.

That is, as illustrated in FIG. 11, a battery element 6 bulges to deform a film covering material 4, with the result that stress concentrates on a boundary between a resin mass 32 and a heat sealing layer 19, causing a crack (resin fracture/peeling portion 17) extending from the heat sealing layer 19 to a barrier layer 12.

Then, contact between the barrier layer 12 at the cracked portion and electrolyte causes corrosion of aluminum or the like of the barrier layer 12, which may generate a defect, such as a hole or a crack, communicating with outside to result in leakage of the electrolyte.

Means for Solving the Problems

The problem of the present invention is solved by a film-covered battery that houses, in a film covering material obtained by stacking a heat sealing layer, a barrier layer, and a protective layer, a battery element obtained by arranging positive and negative electrodes through separators and that has a sealing portion that seals a periphery of the film covering material housing the battery element, wherein the sealing portion includes an agglomeration/sealing portion at least a part of the sealing portion and a first interface bonding portion provided so as to be adjacent to the battery element housing portion side of the agglomeration/sealing portion.

Advantages of the Invention

In the present invention, the interface bonding portion is formed so as to be adjacent to the battery element side of the agglomeration/sealing portion which is formed at least a part of the sealing portion of the film covering material. Thus, when the film-covered battery bulges due to generation of gas inside the battery, the sealing portion is cleaved along the interface bonding portion. As a result, it is possible to prevent damage of the agglomeration/sealing portion and thus to prevent the barrier layer, such as a metal barrier layer, which is an inner layer of the film covering material from being corroded by electrolyte. Thus, a film-covered battery having high long-term reliability can be provided.

BRIEF DESCRIPTION OF THE DRAWINGS

FIGS. 3A to 3C are each a cross-sectional view taken along the line A-A' of FIG. 1, which sequentially explain a sealing process of the film-covered battery according to the present invention, in which

BEST MODE FOR CARRYING OUT THE INVENTION

Embodiments of the present invention will be described in detail below with reference to the accompanying drawings.

Figure 1:
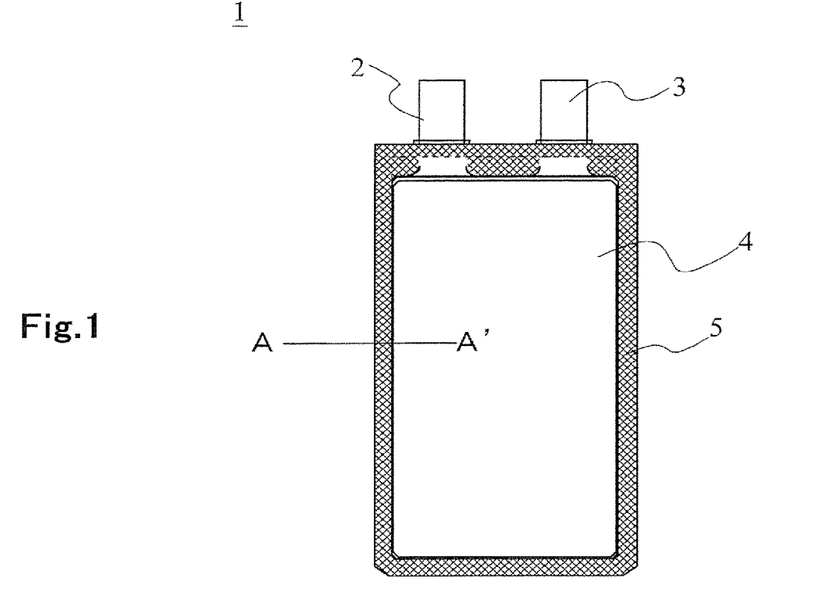
FIG. 1 is a plan view explaining an example of a film-covered battery according to the present invention.

FIG. 1 is a plain view explaining an example of a film-covered battery according to the present invention.

A film-covered battery 1 has a positive electrode terminal 2 and a negative electrode terminal 3 connected respectively to positive and negative electrode lead terminals mounted to a battery element.

The positive electrode terminal 2 and negative electrode terminal 3 are made to protrude from a film covering material 4, and a heat sealing portion 5 is formed around the film covering material 4 for sealing.

In FIG. 1, the battery element is housed by two members each having a housing portion therefor, and then the entire periphery of each of the members is sealed; however, the sealing may be achieved by other methods.

For example, a configuration may be possible in which the battery element is housed by a single folded film covering material or in a housing portion formed by press molding, and then the sealing is performed.

Further, it is possible to employ a configuration in which the battery element is housed in a member obtained by processing the film covering material into a cylindrical shape or an envelope shape, and then an opening of the member is shield.

Further, although the positive electrode terminal 2 and negative electrode terminal 3 are drawn from the same side in the example of FIG. 1, the present invention is not limited to this. The positive electrode terminal 2 and negative electrode terminal 3 may be drawn from different sides (e.g., opposing sides), respectively.

Further, the battery element may be a stacked body obtained by sequentially stacking a plurality of positive electrodes and negative electrodes through separators or may be a winding body obtained by winding a strip-shaped stacked body.

Figure 2:
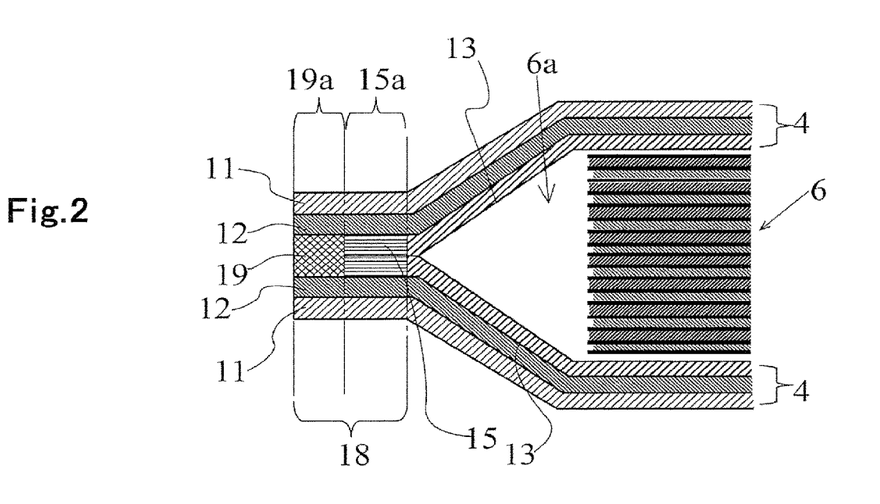
FIG. 2 is a partially cross-sectional view taken along a line A-A' of FIG. 1, which explains an embodiment of the present invention.

FIG. 2 is a partially-cut cross-sectional view of the film-covered battery according to the present invention taken along a line A-A' of FIG. 1.

The film covering material 4 housing a battery element 6 is constituted by a surface protective layer 11 that protects an outer surface, a barrier layer 12 such as a metal barrier layer that prevents transmission of gas, and a heat sealing layer 13 that prevents penetration of electrolyte and heat-welds the film covering material.

As the surface protective layer 11, it is possible to use a synthetic resin material having ductility high enough to prevent fracture upon machining of the film covering material 4 and having a melting point or a softening point higher than that of the heat sealing layer. Particularly, it is preferable to use a resin exhibiting sufficient ductility upon machining and having a high melting point or softening point, such as nylon or polyethylene terephthalate.

As the barrier layer 12, it is possible to use various types of a barrier layer, such as a metal or metal oxide deposition layer or a metal film, that prevents transmission of gas and having ductility high enough to prevent fracture upon machining. Particularly, it is preferable to use an aluminum or aluminum alloy foil having high ductility and excellent in machinability.

As the heat sealing layer 13, it is possible to use a synthetic resin layer having corrosion resistance against the electrolyte and excellent in bonding strength upon heat sealing. Specific examples include: a polyolefin-type synthetic resin, such as polypropylene or polyethylene; and a synthetic resin containing one or a plurality of kinds of a modified polyolefin resin.

The surface protective layer 11, barrier layer 12, and heat sealing layer 13 may each have a single layer structure or a multilayer structure. In the case of the multilayer structure, a plurality of layers may have different characteristics.

A sealing portion 18 of the film covering material 4 has an interface bonding portion 15 at its battery element housing portion 6a side. The interface bonding portion 15 is generated due to a bite of the heat sealing layer of about several micro-meter as a result of pressurizing said heat sealing layer in a softened/semi-molten state. An agglomeration/welding layer is generated when the heat sealing layers reach the melting point and are combined together.

Further, an agglomeration/sealing portion 19 formed by the heat sealing layer in a molten state contacts a side of the interface bonding portion 15 opposite to the housing portion 6a side.

Hereinafter, a range where the interface bonding portion 15 exists is referred to as an interface bonding area 15a, and a region where the agglomeration/sealing portion 19 exists is referred to as an agglomeration/bonding area 19a.

The film-covered battery 1 of the present invention has the interface bonding portion 15 contacting the agglomeration/sealing portion 19. When the battery bulges, only the interface bonding portion 15 having a boundary surface between the heat sealing layers is ruptured along the boundary surface. Thus, damage does not occur in the agglomeration/sealing portion 19, thereby preventing the barrier layer from being exposed.

Figure 3A:
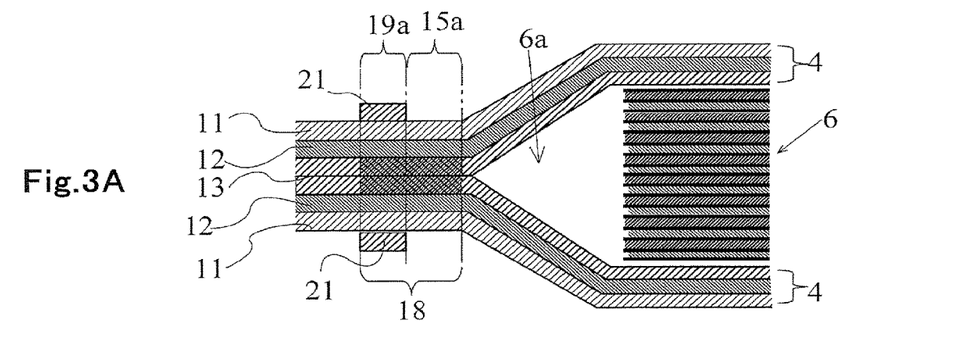
FIG. 3A is a view explaining a heating process.
Figure 3B:
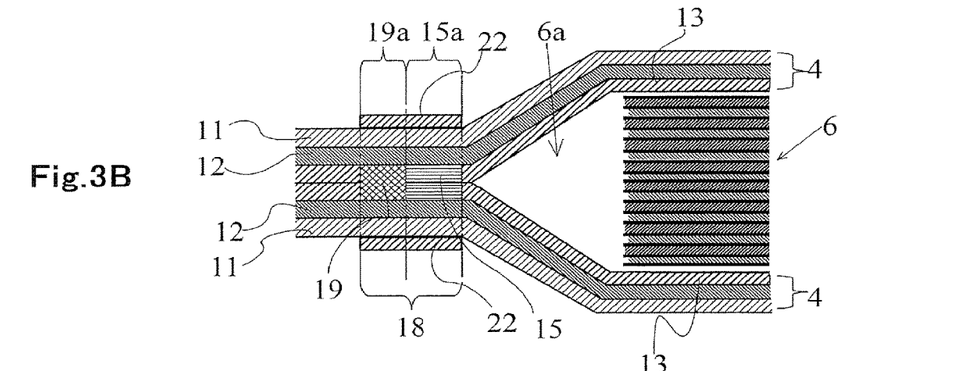
FIG. 3B is a view explaining a cooling process.
Figure 3C:
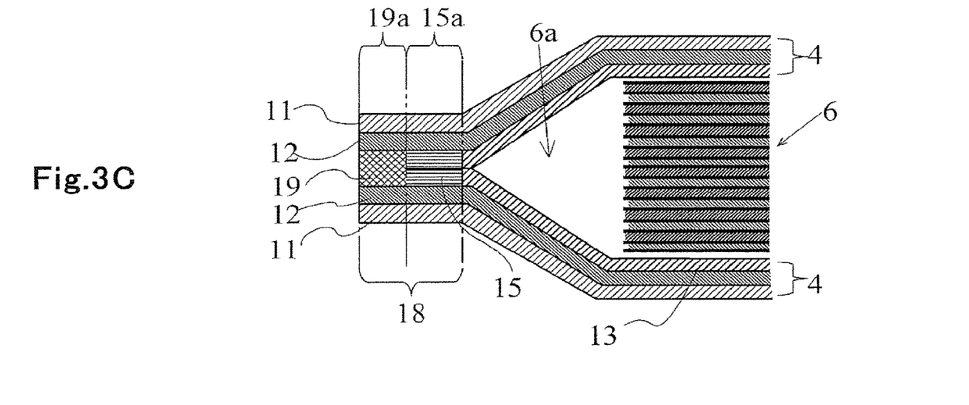
FIG. 3C is a view explaining a sealing portion after the sealing process.

FIGS. 3A to 3C are each a partially-cut cross-sectional view of the film-covered battery according to the present invention taken along the line A-A' of FIG. 1, which explain a manufacturing method of the film-covered battery.

As illustrated in FIG. 3A, two heating members 21 are used to press both surfaces of the sealing portion 18 and perform heating until a welding surface of the heat sealing layer reaches a molten state.

Then, after removal of the heating members 21, two cooling members 22 are used to cool an area positioned at a boundary with an embossed portion from both sides, as illustrated in FIG. 3B. The area to be cooled includes an area against which the heating member is pressed and its adjacent area on the battery element housing portion 6a side. This cooling prevents a size of crystal grain in the agglomeration/sealing portion 19 from being increased due to recrystallization and allows formation of the interface bonding portion 15 in the vicinity of a portion in the sealing portion 18 against which the heating member is pressed.

Then, as illustrated in FIG. 3C, sides of an outer periphery of the film covering material are sealed by heat sealing, excluding an electrolyte pouring portion of a side at which the electrolyte is poured, and a periphery of each side is cut into a predetermined shape. After the electrolyte is poured through the electrolyte pouring portion, the electrolyte pouring portion is sealed in the same manner, whereby the film-covered battery is obtained.

Figure 4:
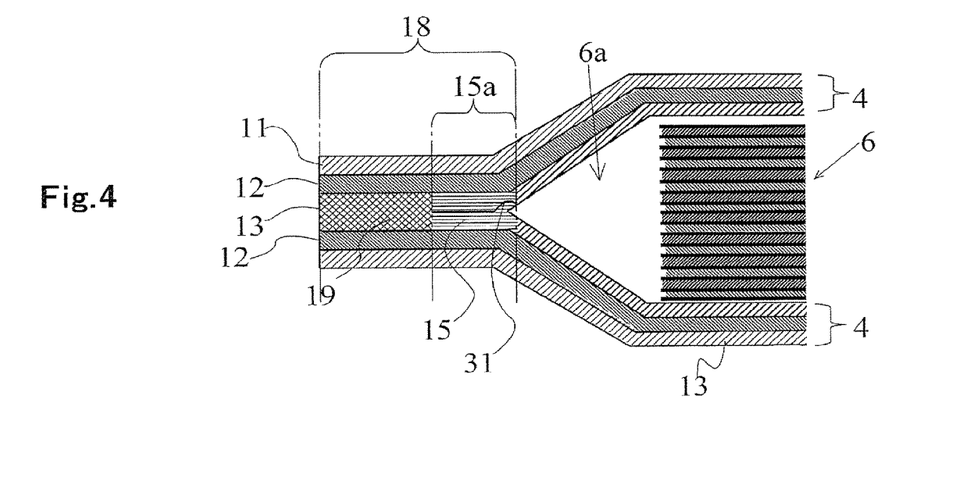
FIG. 4 is a cross-sectional view taken along the line A-A' of FIG. 1, which explains another embodiment of the present invention.

FIG. 4 is a partially-cut cross-sectional view of the film-covered battery according to the present invention taken along the line A-A' of FIG. 1, which explains another embodiment of the present invention.

The sealing portion 18 of the film covering material 4 has the agglomeration/sealing portion 19 and interface bonding portion 15, and the interface bonding portion has a curved portion 31.

The battery according to this embodiment is formed by slightly displacing the two heating members (not illustrated) that sandwich the film covering material from each other. That is, a displacement is generated in an area of the sealing portion 18 where the heat sealing layer is softened.

In the sealing portion, an end face of one heating member on the embossed portion side pushes the heat sealing layer of the film covering material 4 to the embossed portion side more than the other heating member does.

That is, pushing the heat sealing layer toward the battery element housing portion 6a side causes the curved portion 31 in the interface bonding portion 15 where an interface thereof is curved.

In the present invention, even when there is a slight displacement between the heating members, the interface bonding portion 15 can be similarly formed in the battery element housing portion 6a side of the agglomeration/sealing portion 19. Further, the interface bonding portion 15 whose length is increased by the curvature exhibits large resistance against the rupture.

Figure 5:
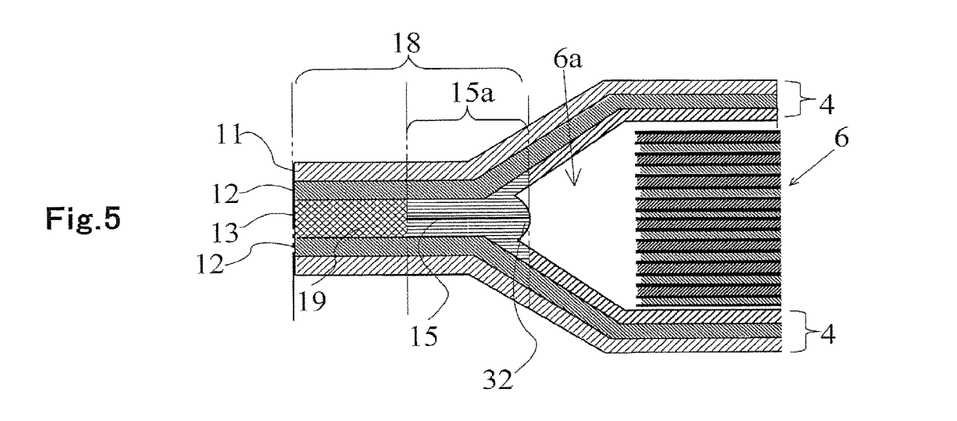
FIG. 5 is a cross-sectional view taken along the line A-A' of FIG. 1, which explains still another embodiment of the present invention.

FIG. 5 is a partially-cut cross-sectional view of the film-covered battery according to the present invention taken along the line A-A' of FIG. 1, which explains still another embodiment of the present invention. The sealing portion 18 of the film covering material 4 has the agglomeration/sealing portion 19 and interface bonding portion 15, and the interface bonding portion has a resin mass 32.

As compared with the battery illustrated in FIG. 3, end faces of the two heating members (not illustrated) are brought close to a flat portion boundary side of the battery element housing portion 6a which is a boundary between the embossed portion of the battery element housing portion 6a and a flat portion. As a result, the heat sealing layer protrudes inward from the sealing portion to form the resin mass 32.

The resin mass 32 is formed integrally with the interface bonding portion 15, so that a distance of the interface bonding portion 15 from the agglomeration/sealing portion 19 is increased. As a result, a distance from an end portion of the resin mass 32 at which the rupture starts to a point at which the rupture reaches the agglomeration/sealing portion 19 is advantageously increased.

Figure 6:
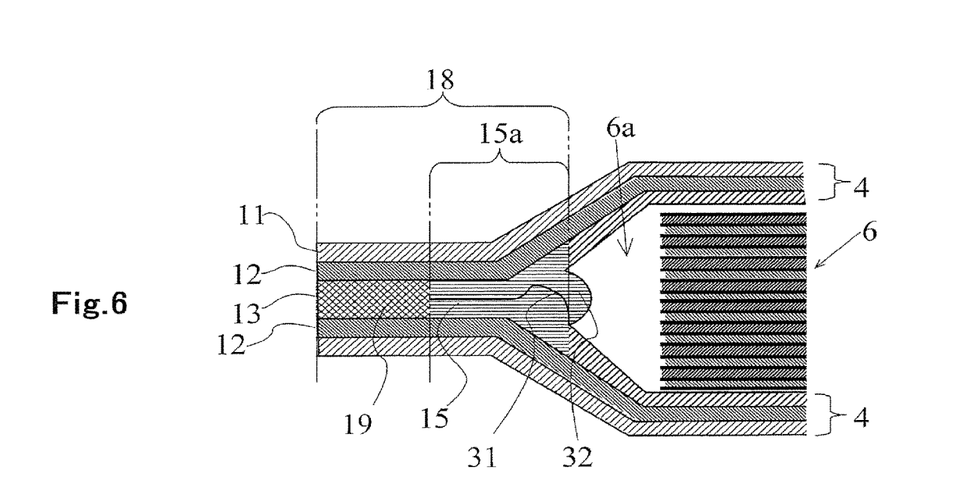
FIG. 6 is a cross-sectional view taken along the line A-A' of FIG. 1, which explains still another embodiment of the present invention.

FIG. 6 is a partially-cut cross-sectional view of the film-covered battery according to the present invention taken along the line A-A' of FIG. 1, which explains still another embodiment of the present invention.

This embodiment differs from that illustrated in FIG. 3 in the following points: end faces of the two heating members (not illustrated) are brought close to the flat portion boundary side of the battery element housing portion 6a which is the boundary between the embossed portion of the battery element housing portion 6a and flat portion; and a slight displacement is generated between the two heating members. In the sealing portion of FIG. 6, a displacement is generated in an area where the heat sealing layer is melted.

As a result, the heat sealing layer protrudes inward from the sealing portion to form the resin mass 32 and further to form the curved portion 31 of the interface. Further, the length of the interface bonding portion 15 is increased by the curved portion 31, enhancing resistance against the rupture and enhancing strength of the sealing portion 18 by the resin mass 32.

FIG. 6 illustrates as if the resin mass 32 protruding inward upon the heat sealing and heat sealing layer at an inner surface of the film covering material are separated from each other; however, the boundary between the heat sealing layers is not clearly defined, but the protruding resin mass and heat sealing layer at the inner surface of the film covering material are integrally formed. The same applies to the other figures.

Figure 7:
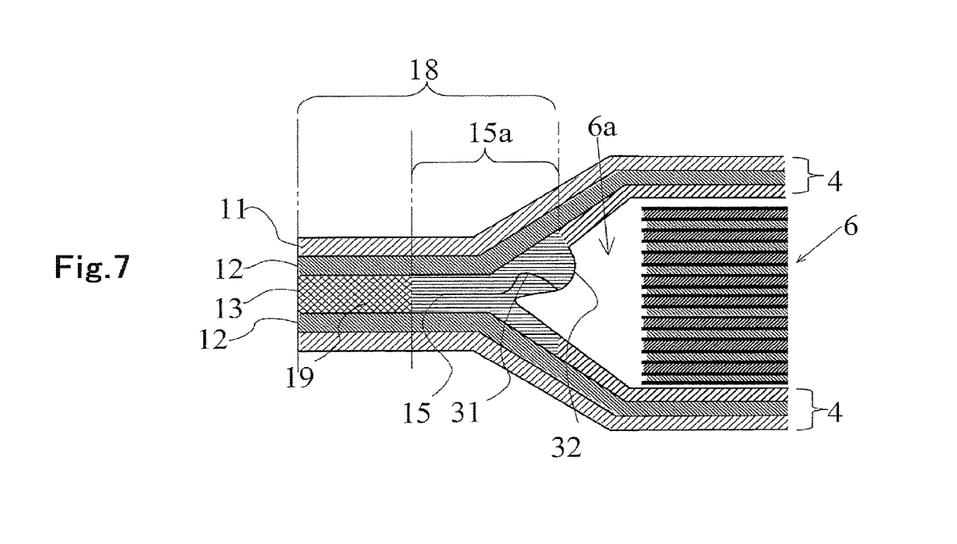
FIG. 7 is a cross-sectional view taken along the line A-A' of FIG. 1, which explains still another embodiment of the present invention.

FIG. 7 is a partially-cut cross-sectional view of the film-covered battery according to the present invention taken along the line A-A' of FIG. 1, which explains still another embodiment of the present invention.

In the battery of the embodiment illustrated in FIG. 7, the resin mass 32 generated due to the displacement between the two heating members is formed at a position different from that illustrated in FIG. 6.

That is, as compared with FIG. 6, a displacement amount between the two heating members that sandwich the film covering material is increased. Further, the end face of the heating member is brought close to the boundary between the embossed portion and flat portion of the film covering material for sealing. This increases an amount of the resin to be made to protrude toward the battery inner side. Thus, the resin protrusion amount is biased corresponding to the displacement amount between the heating members, with the result that the curved portion 31 is formed in the interface bonding portion 15.

As in the film-covered battery of FIG. 6, the length of the interface of the interface bonding portion 15 is increased by the curved portion 31 formed in the interface bonding portion 15 to enhance resistance against the rupture. This provides a large effect in preventing a reduction in strength of the agglomeration/sealing portion 19 against damage.

Figure 8:
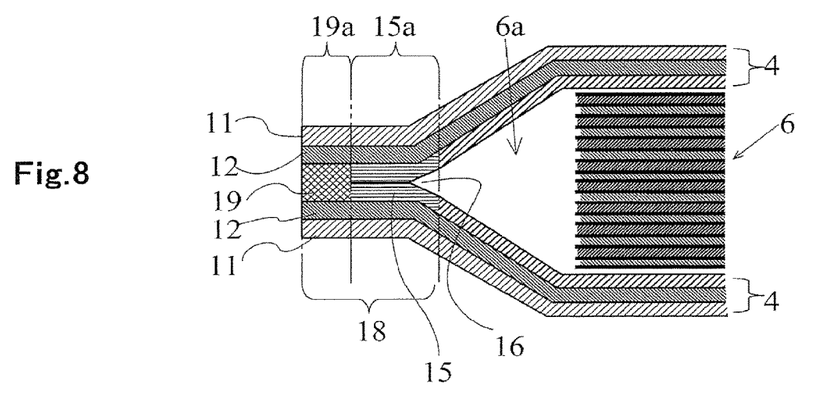
FIG. 8 is a cross-sectional view taken along the line A-A' of FIG. 1, which explains an example of the present invention.

FIG. 8 is a partially-cut cross-sectional view of the film-covered battery according to the present invention taken along the line A-A' of FIG. 1, which explains still another embodiment of the present invention.

In the embodiment of FIG. 8, as a result of a pressure rise inside the film covering material, an interface bonding peeling portion 16 is formed at an end portion of the interface bonding portion 15.

As described above, when the internal pressure rises, an end portion of the interface bonding portion 15 close to an inside of the battery element housing portion side 6a having lower strength than the agglomeration/sealing portion 19 is selectively cleaved first.

As a result, the interface bonding peeling portion 16 is generated. Even when the interface bonding peeling portion 16 is generated, cleavage of the entire interface bonding portion 15, damage of the agglomeration/sealing portion 19, or exposure of the barrier layer 12 such as aluminum does not occur.

Figure 9:
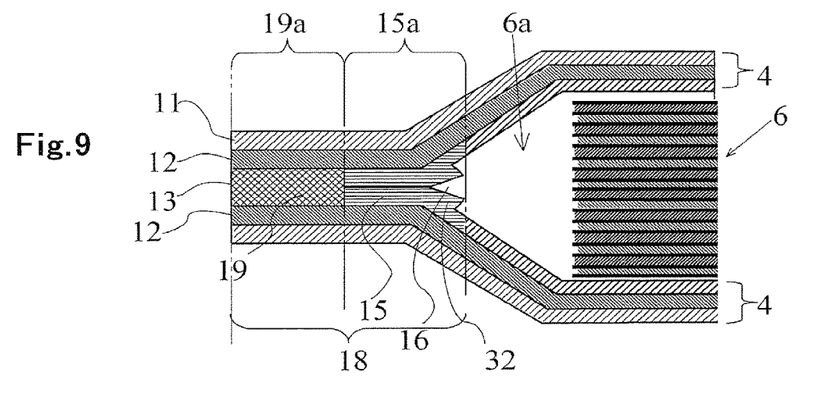
FIG. 9 is a cross-sectional view taken along the line A-A' of FIG. 1, which explains an example of the present invention.

FIG. 9 is a partially-cut cross-sectional view of the film-covered battery according to the present invention taken along the line A-A' of FIG. 1, which explains still another embodiment of the present invention.

In the embodiment of FIG. 9, as a result of a pressure rise inside the film covering material, the interface bonding peeling portion 16 is generated in the resin mass 32 formed at the end portion of the interface bonding portion 15.

When the internal pressure rises, an end portion of the interface bonding portion 15 close to the inside of the battery element side having is selectively cleaved first. As a result, the interface bonding peeling portion 16 is generated. Even when the interface bonding peeling portion 16 is generated, cleavage of the entire interface bonding portion 15, damage of the agglomeration/sealing portion 19, or exposure of the barrier layer 12 such as aluminum does not occur.

In addition, as illustrated in this example, the resin mass 32 is formed so as to contact the interface bonding portion 15, so that the cleavage stops inside the resin mass 32, preventing the interface bonding portion 15 from being adversely affected.

EXAMPLES

The following describes examples and comparative Examples of the present invention.

Example 1

(Production of Positive Electrode)

92 parts by mass of manganese lithium ($LiMn_2O_4$) powder, 5 parts by mass of carbon black, and 3 parts by mass of polyvinylidene fluoride were kneaded with NMP to prepare a positive electrode slurry. The obtained positive electrode slurry was coated on both side surfaces of a 20 μm thickness aluminum foil and then dried, followed by pressing of a positive electrode surface by a roll.

Then, the aluminum foil coated with a positive electrode active material was cut to obtain a positive electrode in which a positive electrode with 105 mm length and 55 mm width and a positive electrode tab with 15 mm length and 10 mm width is integrally formed.

(Production of Negative Electrode)

91 parts by mass of graphite, 1 part by mass of carbon black, and 8 parts by mass of polyvinylidene fluoride were kneaded with NMP to prepare a negative electrode slurry. The obtained negative electrode slurry was coated on both side surfaces of a 10 μm thickness copper foil and then dried, followed by pressing of a negative electrode surface by a roll.

Then, the copper foil coated with a negative electrode active material was cut to obtain a negative electrode in which a negative electrode with 109 mm length and 59 mm width and a negative electrode tab with 12 mm length and 10 mm width is integrally formed.

(Production of Battery Element)

The obtained positive and negative electrodes were alternately stacked through separators each made of polypropylene and having a length of 111 mm, a width of 59 mm, and a thickness of 25 μm such that the outermost layer is the negative electrode to produce the battery element. The number of the positive electrodes used was 15, and that of negative electrodes used was 16.

As a positive electrode lead terminal to be led outside the film covering material, an aluminum foil with 30 mm length, 10 mm width, and 200 μm thickness was used. Further, an aluminum lead terminal including a synthetic resin layer to be integrated with the film covering material upon sealing was connected to the positive electrode tab of each of the stacked positive electrodes.

Further, as a negative electrode lead terminal, a copper foil with 30 mm length, 10 mm width, and 200 μm thickness was used. A copper lead terminal including a synthetic resin layer to be integrated with the film covering material upon sealing was connected to the negative electrode tab of each of the stacked negative electrodes.

(Production of Film-covered Battery)

As the film covering material, a laminated film including the following layers was used:

Surface protective layer: made of nylon with 25 μm thickness;

Barrier layer: aluminum foil with 40 μm thickness;

Adhesive inner layer: polypropylene film having three-layer structure of random-block-random with thickness of 50 μm, melting point of 145° C., and softening point of 120° C.

There were prepared two film covering material s each having a length of 180 mm, a width of 100 mm, and a thickness of 115 μm. A concave portion having a length of 120 mm, a width of 70 mm, and a depth of 3 mm was formed by embossing in a center of each of the film covering materials.

The battery element was housed in the concaved portion formed by the embossing, and the positive and negative lead terminals were led outside the film covering material from one side.

The side from which the lead terminals are lead and two sides contacting the side from which the lead terminals are lead were sealed to form positive and negative electrode terminals.

Then, electrolyte was poured with a side opposite to the side from which the lead terminals are led as a pouring side, and finally the pouring side was sealed. As the electrolyte, one obtained by dissolving a lithium salt such as LiPF6 in a mixed solvent composed of ethylene carbonate and diethyl carbonate was used.

For a terminal side, two heating members each having a width of 5 mm and each having a temperature of 180° C. were each disposed such that the end face thereof on the embossed portion side is separated by 0.5 mm from the boundary between the embossed portion of the film covering material and flat portion thereof toward the flat portion side. Then, the film covering material was sandwiched by the two heating members, arranged with a clearance of 0.2 mm for 6 seconds for sealing.

Thereafter, two cooling members each having a width of 5.6 mm and each having a temperature of 25° C. were each disposed such that the end face thereof on the embossed portion side is positioned at the boundary between the embossed portion and flat portion. Then, the film covering material was sandwiched by the two cooling members, arranged with a clearance of 0.2 mm for 1.5 seconds for cooling.

For each of lateral sides, two heating members each having a width of 7.5 mm and each having a temperature of 160° C. were each disposed such that the end face thereof on the embossed portion side is separated by 0.5 mm from the boundary between the embossed portion of the film covering material and flat portion thereof. Then, the film covering material was sandwiched by the two heating members, arranged with a clearance of 0.1 mm for 5 seconds for sealing.

Thereafter, two cooling members each having a width of 10 mm and each having a room temperature were each disposed such that the end face thereof on the embossed portion side is positioned at the boundary between the embossed portion and flat portion. Then, the film covering material was sandwiched by the two cooling members, arranged with a clearance of 0.15 mm for 3 seconds for cooling.

The electrolyte was poured into the thus produced film-covered battery before pouring from the pouring side.

Then, for the pouring side, two heating members each having a width of 7.5 mm and each having a temperature of 170° C. were each disposed such that the end face thereof on the embossed portion side is separated by 0.5 mm from the boundary between the embossed portion of the film covering material and flat portion thereof. Then, the film covering material was sandwiched by the two heating members, arranged with a clearance of 0.075 mm for 5 seconds for sealing.

Thereafter, two cooling members each having a width of 10 mm and each having a room temperature were each disposed such that the end face thereof on the embossed portion side is positioned at the boundary between the embossed portion and flat portion. Then, the film covering material was sandwiched by the two cooling members, arranged with a clearance of 0.15 mm for 3 seconds for cooling.

Finally, welding portions of the respective lateral sides and pouring side were each cut off for shaping the appearance while leaving 5 mm, whereby a film-covered battery having a cross sectional structure illustrated in FIG. 2 was obtained.

In the present invention, in consideration of a difference in temperature characteristics of the welding potion, the agglomeration/sealing portion layer and interface bonding layer are made to be formed at all the welding portions by temperature setting according to the individual welding portions.

Example 2

One of the two heating members in Example 1 was disposed such that the end face thereof on the embossed portion side is separated by 0.5 mm from the boundary between the embossed portion of the film covering material and flat portion, and the other one thereof was disposed such that the end face thereof on the embossed portion side is separated by 0.6 mm from the boundary between the embossed portion of the film covering material and flat portion thereof toward the flat portion side, followed by sealing.

The film-covered battery was produced with other conditions being the same as those in Example 1. As a result, a film-covered battery having a cross sectional structure illustrated in FIG. 4 was obtained.

By slightly displacing the two heating members that sandwiching the film covering material, a displacement is generated in a position where the heat sealing layer of the sealing portion is softened.

As a result, the heat sealing layer of the film covering material contacting the heating member whose end face on the embossed portion side is closer to the boundary between the embossed portion of the film covering material and flat portion thereof is pushed out toward the battery inner side from a position at which an embossed portion side end face of the welding layer of the film covering material contacting the other heating member is located, thereby forming a curved portion in which an interface where the interface bonding portion appears is curved.

A deterioration acceleration test was performed for the battery produced in Example 2 in the same manner as for the battery of Example 1, and results thereof are shown in Tables 1 and 2.

Example 3

The heating members used in Example 1 were each disposed such that the end face thereof on the embossed portion side is separated by 0.3 mm from the boundary between the embossed portion of the film covering material and flat portion thereof toward the flat portion side. The film-covered battery was produced with other conditions being the same as those in Example 1. As a result, a film-covered battery having a cross sectional structure illustrated in FIG. 5 was obtained.

That is, the end face of the heating member is separated by 0.3 mm from the boundary between the embossed portion of the film-shaped covering material and flat portion thereof toward the flat portion side, followed by sealing.

As a result, the heat sealing layer protrudes inward from the sealing portion to form the resin mass 32.

The deterioration acceleration test was performed for the battery produced in Example 3 in the same manner as for the battery of Example 1, and results thereof are shown in Tables 1 and 2.

Example 4

One of the two heating members in Example 3 was disposed such that the end face thereof on the embossed portion side is separated by 0.3 mm from the boundary between the embossed portion of the film covering material and flat portion.

The other one of the two heating members was disposed such that the end face thereof on the embossed portion side is separated by 0.4 mm from the boundary between the embossed portion of the film covering material and flat portion thereof toward the flat portion side, followed by sealing. The file-armored battery was produced with other conditions being the same as those in Example 1. As a result, a film-covered battery having a cross sectional structure illustrated in FIG. 6 was obtained.

The deterioration acceleration test was performed for the battery produced in Example 4 in the same manner as for the battery of Example 1, and results thereof are shown in Tables 1 and 2.

In the battery of this example, by slightly displacing the two heating members that sandwiching the film covering material, a displacement is generated in a position where the heat sealing layer of the sealing portion is softened. As a result, the heat sealing layer of the film covering material contacting the heating member whose end face on the embossed portion side is closer to the boundary between the embossed portion of the film covering material and flat portion thereof is pushed out toward the battery inner side from a position at which an embossed portion side end face of the welding layer of the film covering material contacting the other heating member is located.

Further, the interface 31 appearing in the interface bonding portion 31 is curved, and the curved portion extends to the resin mass 32.

Example 5

One of the two heating members in Example 4 was disposed such that the end face thereof on the embossed portion side is separated by 0.2 mm from the boundary between the embossed portion of the film covering material and flat portion toward the flat portion side, and the other one of the two heating members was disposed such that the end face thereof on the embossed portion side is separated by 0.4 mm from the boundary between the embossed portion of the film covering material and flat portion thereof toward the flat portion side, followed by sealing.

The film-covered battery was produced with other conditions being the same as those in Example 3. As a result, a film-covered battery having a cross sectional structure illustrated in FIG. 7 was obtained.

A displacement amount between the two heating members that sandwich the film covering material is increased, and thus the end face of the heating member is brought close to the boundary between the embossed portion and flat portion of the film covering material for sealing.

Thus, the resin protrusion amount is biased corresponding to the displacement amount between the heating members, and the interface appearing in the interface bonding portion is curved.

The deterioration acceleration test was performed for the battery produced in Example 5 in the same manner as for the battery of Example 1, and results thereof are shown in Tables 1 and 2.

Example 6

The film-covered battery was produced in the same manner as in Example 1 except that cooling by the cooling members is performed 4 seconds after completion of the heating by the heating members. The deterioration acceleration test was performed for the battery produced in Example 6 in the same manner as for the battery of Example 1, and results thereof are shown in Tables 1 and 2.

Example 7

The film-covered battery was produced in the same manner as in Example 2 except that cooling by the cooling members is performed 4 seconds after completion of the heating by the heating members. The deterioration acceleration test was performed for the battery produced in Example 7 in the same manner as for the battery of Example 1, and results thereof are shown in Tables 1 and 2.

Example 8

The film-covered battery was produced in the same manner as in Example 3 except that cooling by the cooling members is performed 4 seconds after completion of the heating by the heating members. The deterioration acceleration test was performed for the battery produced in Example 8 in the same manner as for the battery of Example 1, and results thereof are shown in Tables 1 and 2.

Example 9

The film-covered battery was produced in the same manner as in Example 4 except that cooling by the cooling members is performed 4 seconds after completion of the heating by the heating members. The deterioration acceleration test was performed for the battery produced in Example 9 in the same manner as for the battery of Example 1, and results thereof are shown in Tables 1 and 2.

Example 10

The film-covered battery was produced in the same manner as in Example 5 except that cooling by the cooling members is performed 4 seconds after completion of the heating by the heating members. The deterioration acceleration test was performed for the battery produced in Example 10 in the same manner as for the battery of Example 1, and results thereof are shown in Tables 1 and 2.

Comparative Example 1

The temperature of the heating member upon heat sealing of the sealing portion was set to 200° C. for the terminal lead side, set to 180° C. for the side walls, and set to 190° C. for the pouring side, thereby setting the temperatures of the respective welding portions of the sealing portion in a range of 155° C. to 190° C. That is, by setting the welding temperature of the heat sealing portion to a value sufficiently higher than the melting point, the sealing portion and resin mass are each made to be composed of a crystal part.

The film-covered battery was produced with other conditions being the same as those in Example 3. As a result, as illustrated in FIG. 10, the resin mass 32 is formed in the agglomeration/sealing portion 19.

The deterioration acceleration test was performed for the battery produced in Comparative Example 1 in the same manner as for the battery of Example 1, and results thereof are shown in Tables 1 and 2.

Comparative Example 2

The battery was produced in the same manner as in Comparative Example 1 except that cooling by the cooling members is performed 4 seconds after completion of the heating.

The deterioration acceleration test was performed for the battery produced in Comparative Example 2 in the same manner as for the battery of Example 1, and results thereof are shown in Tables 1 and 2.

Evaluation Test Method 1
Tension Test Result

A test was performed for the produced batteries according to the following valuation method, and results are shown in the following Tables.

The side surface of the film covering material was cut into a width of 15 mm and a length of 50 mm in a direction perpendicular to the heat sealing direction to obtain a test piece for a tension test. The test piece was folded such that two unwelded portions are aligned on a straight line to obtain a T-like test piece. With one of the unwelded portions of the T-like test piece fixed, the other unwelded portion was pulled in a vertical direction by a tension gauge at a speed of 10 mm/min, and the maximum tension strength and a position where the aluminum layer is exposed were confirmed. Confirmation results are shown in Table 1.

The tension strength was about 140 N/15 mm in Examples 1 to 5 and Comparative Example 1 in which a time period after the completion of heating until a start of the cooling is set to 1 second, while the tension strength was about 110 N/15 mm in Examples 6 to 10 and Comparative Example 2 in which a time period after the completion of heating until a start of the cooling is set to 4 seconds. It is considered that this is because recrystallization proceeds due to an increase in interval between the end of the heating and start of the cooling to accelerate embrittlement of the agglomeration/sealing portion.

The distance up to the exposure of the aluminum layer is 0.5 mm in Examples 1 and 3, 0.6 mm in Example 2, 0.7 mm in Example 4, and 0.9 mm in Example 5, while it was 0.0 mm in Comparative Examples.

Further, in Examples 1 to 10, unlike the Comparative Examples 1 and 2, the cleavage of the formed interface bonding layer reaches the agglomeration/welding layer and then the aluminum layer is exposed. Further, in Examples 2, 4, 5, 7, 9, and 10, the curvature of the interface bonding layer increases a distance of the cleavage, thereby increasing the distance up to the exposure of the metal layer as compared with Examples 1, 3, 6, and 8.

TABLE 1

|  | Tensile strength (N/15 mm) | Aluminum layer exposed position (mm) |
|---|---|---|
| Example 1 | 143 | 0.5 |
| Example 2 | 141 | 0.6 |
| Example 3 | 138 | 0.5 |
| Example 4 | 142 | 0.8 |
| Example 5 | 144 | 0.9 |
| Example 6 | 112 | 0.5 |
| Example 7 | 115 | 0.6 |
| Example 8 | 114 | 0.5 |
| Example 9 | 112 | 0.8 |
| Example 10 | 116 | 0.9 |
| Comparative Example 1 | 140 | 0.0 |
| Comparative Example 2 | 142 | 0.0 |

Evaluation Test Method 2
Degradation Acceleration Test Result 40 batteries of each of Examples 1 to 10 and Comparative Examples 1, 2 were fully charged and then subjected to the following test.

An aluminum jig was used to fix a thickness direction of the battery at a regular position so that only a portion around the welding portion bulges.

For the degradation acceleration test, 20 batteries were left under an environment of 70° C. for two months, and remaining 20 batteries were left under an environment of 85° C. for two month.

For these batteries, presence/absence of a volume increase of 10% or more (i.e., bulge) compared with the battery before test was checked. Further, a litmus paper was attached around the sealing portion of the film covering material to check presence/absence of leakage of the electrolyte.

For the battery in which the bulge of the film covering material was confirmed, a state of the A-A' cross section in FIG. 1 was observed.

A degradation evaluation result at 70° C. is shown in Table 2, and a degradation evaluation result at 85° C. is shown in Table 3.

It is confirmed that when the test battery bulges by 10% or more in a state where a thickness of the battery is not change due to fixation using the jig, a load started to be applied to the welding portion due to the bulge.

In the degradation test at 70° C., the leakage is not confirmed in Examples 1 to 10, while the leakage is confirmed in three batteries and five batteries in Comparative Examples 1 and 2, respectively.

On the other hand, in the degradation test at 85° C., the leakage is not confirmed in Examples 4 and 5.

The number of batteries in which the leakage occurred is: five in Example 1, three in Example 2, four in Example 3, nine in Example 6, seven in Example 7, 0 in Example 8, 14 in Comparative Example 1, and 18 in Comparative Example 2.

An observation result of the cross section after the degradation test at 70° C. reveals that the batteries of Examples 1, 2, 6, and 7 each in which the bulge is observed are batteries in which the interface peeling portion is formed in the interface bonding portion as illustrated in FIG. 8.

Further, the aluminum layer is not exposed in Examples 1, 2, 6, and 7.

The batteries of Examples 3 to 5 and 8 to 10 each in which the bulge is observed are batteries in which the interface peeling portion 16 is formed in the interface bonding portion 15 as illustrated in FIG. 8; however, the aluminum layer is not exposed in these Examples.

It is considered that this is because the interface bonding portion 15 is not integrated with the sealing portion or resin mass.

That is, the interface bonding portion 15 is smaller in strength than that of the heat sealing layer or integrally bonded agglomeration/sealing portion 19, and the time period after the completion of heating until a start of the cooling is long, so that an end portion of the interface bonding portion 15 is first peeled.

In addition, batteries in which the resin mass is formed so as to contact the interface bonding portion include one in which the peeling stops at a surface in the resin mass and does not reach even the sealing portion.

Further, the batteries of Examples 2, 4, 5, 7, 9 and 10 each in which the curved portion is formed in the interface bonding portion are higher in bonding strength of the interface bonding portion than the batteries of Examples 1, 3, 6, and 8 since the distance of the interface bonding layer is increased due to the curvature although the peeling distance is the same.

An observation result of the cross section after the degradation test at 85° C. reveals that among the batteries of Examples 1 to 3 and 6 to 8 each in which the bulge is observed, those with electrolyte leakage are batteries in which the interface peeling portion reaches the agglomeration/welding surface. Further, a fracture of the resin layer occurs at that portion to expose the aluminum layer, and thus corrosion of the aluminum layer is confirmed.

On the other hand, in the batteries each in which the leakage does not occur, the interface peeling portion does not reach the agglomeration/sealing portion, and thus the aluminum layer is not exposed.

In Examples 6 to 8, the time period after the completion of heating until the start of the cooling is increased as compared with Examples 1 to 3, so that embrittlement of the heat sealing layer is accelerated. When the embrittlement proceeds to make the agglomeration/bonding surface brittle, a cracking of the heat sealing layer is easily generated.

Further, in all of the batteries of Examples 4, 5, 9, and 10 each in which the bulge occurs, the interface peeling portion does not reach the agglomeration/welding surface as illustrated in FIG. 9, and thus the aluminum layer is not exposed. It is considered that this is because that the resin mass 32 exists and that the distance over which the interface peeling portion reaches the agglomeration/welding surface is longer than that in other Examples due to the curvature of the interface bonding portion.

On the other hand, among the batteries in Comparative Examples 1 and 2 in which the bulge occurs, three batteries in Comparative Example 1 and five batteries in Comparative Example 2 each undergo cracking in a boundary between the resin mass and heat sealing layer at a side opposite to the sealing portion as illustrated in FIG. 11 to expose the aluminum layer, and thus corrosion of the aluminum layer is confirmed.

TABLE 2

| | Number of batteries each in which leakage occurs | Presence/absence of bulge | Corrosion of aluminum layer |
|---|---|---|---|
| Example 1 | 0 | 7 | 0 |
| Example 2 | 0 | 6 | 0 |
| Example 3 | 0 | 5 | 0 |
| Example 4 | 0 | 8 | 0 |
| Example 5 | 0 | 6 | 0 |
| Example 6 | 0 | 5 | 0 |
| Example 7 | 0 | 6 | 0 |
| Example 8 | 0 | 7 | 0 |
| Example 9 | 0 | 6 | 0 |
| Example 10 | 0 | 7 | 0 |
| Comparative Example 1 | 3 | 11 | 3 |
| Comparative Example 2 | 5 | 14 | 5 |

TABLE 3

| | Number of batteries each in which leakage occurs | Presence/absence of bulge | Corrosion of aluminum layer |
|---|---|---|---|
| Example 1 | 5 | 20 | 5 |
| Example 2 | 3 | 20 | 3 |
| Example 3 | 4 | 20 | 4 |
| Example 4 | 0 | 20 | 0 |
| Example 5 | 0 | 20 | 0 |
| Example 6 | 9 | 20 | 9 |
| Example 7 | 7 | 20 | 7 |
| Example 8 | 0 | 20 | 9 |
| Example 9 | 0 | 20 | 0 |
| Example 10 | 0 | 20 | 0 |
| Comparative Example 1 | 14 | 20 | 14 |
| Comparative Example 2 | 18 | 20 | 18 |

INDUSTRIAL APPLICABILITY

The interface bonding portion is formed so as to be adjacent to the battery element side of the agglomeration/sealing portion which is formed at least a part of the sealing portion of the film covering material obtained by stacking the protective layer, barrier layer such as a metal foil, and heat sealing layer. With this configuration, it is possible to prevent an agglomerated mass or an agglomerated lump formed at the end portion of the agglomeration/sealing portion from being a starting point of the cleavage. As a result, it is possible to prevent the barrier layer, such as the metal foil, of the film covering material from being exposed to be corroded by electrolyte even when the film-covered battery bulges due to generation of gas inside the battery, and thus the film-covered battery having high long-term reliability can be provided.

REFERENCE SIGNS LIST

1: Film-covered battery
2: Positive electrode terminal
3: Negative electrode terminal
4: Film covering material
6: Battery element
6a: Battery element housing portion
11: Surface protective layer
12: Barrier layer
13: Heat sealing layer
15: Interface bonding portion
16: Interface welding peeling portion
17: Resin fracture/peeling portion
18: Sealing portion
19: Agglomeration/sealing portion
21: Heating member
22: Cooling member
32: Resin mass

The invention claimed is:

1. A film-covered battery that houses, in a film covering material obtained by stacking a heat sealing layer, a barrier layer, and a protective layer, a battery element obtained by arranging positive and negative electrodes through separators and that has a sealing portion that seals a periphery of the film covering material housing the battery element, the sealing portion comprising: an agglomeration/sealing portion; and a first interface bonding portion having a bonding interface between portions of the film covering material, the first interface bonding portion being provided so as to be adjacent to the battery element housing portion side of the agglomeration/sealing portion, wherein a curved portion is formed in at least a part of a bonding boundary of the first interface bonding portion.

2. The film-covered battery according to claim 1, further comprising
a resin mass formed in the vicinity of a part of the sealing portion on the battery element housing portion side.

3. The film-covered battery according to claim 2, wherein the resin mass and sealing portion are integrally formed with each other or disposed adjacent to each other.

4. The film-covered battery according to claim 3, further comprising
a second interface bonding portion having a bonding interface between the portions of the film covering material formed inside the resin mass.

5. The film-covered battery according to claim 4, further comprising
a curved portion formed in the second interface bonding portion.

6. The film-covered battery according to claim 5, wherein the first interface bonding portion and second interface bonding portion are continuously formed.

7. The film-covered battery according to claim 6, wherein the resin mass is integrally formed with and at a part of the interface bonding portion on the battery element housing portion side.

8. The film-covered battery according to claim 4, wherein the first interface bonding portion and second interface bonding portion are continuously formed.

9. The film-covered battery according to claim 8, wherein the resin mass is integrally formed with and at a part of the interface bonding portion on the battery element housing portion side.

10. The film-covered battery according to claim 4, wherein
the resin mass is integrally formed with and at a part of the interface bonding portion on the battery element housing portion side.

11. The film-covered battery according to claim 5, wherein the resin mass is integrally formed with and at a part of the interface bonding portion on the battery element housing portion side.

12. The film-covered battery according to claim 2, further comprising
a second interface bonding portion having a bonding interface between the portions of the film covering material formed inside the resin mass.

13. The film-covered battery according to claim 12, further comprising
a curved portion formed in the second interface bonding portion.

14. The film-covered battery according to claim 13, wherein
the first interface bonding portion and second interface bonding portion are continuously formed.

15. The film-covered battery according to claim 14, wherein
the resin mass is integrally formed with and at a part of the interface bonding portion on the battery element housing portion side.

16. The film-covered battery according to claim 13, wherein
the resin mass is integrally formed with and at a part of the interface bonding portion on the battery element housing portion side.

17. The film-covered battery according to claim 12, wherein
the first interface bonding portion and second interface bonding portion are continuously formed.

18. The film-covered battery according to claim 17, wherein
the resin mass is integrally formed with and at a part of the interface bonding portion on the battery element housing portion side.

19. The film-covered battery according to claim 12, wherein
the resin mass is integrally formed with and at a part of the interface bonding portion on the battery element housing portion side.

* * * * *